US008589823B2

(12) United States Patent
Lemay et al.

(10) Patent No.: US 8,589,823 B2
(45) Date of Patent: Nov. 19, 2013

(54) APPLICATION USER INTERFACE WITH NAVIGATION BAR SHOWING CURRENT AND PRIOR APPLICATION CONTEXTS

(75) Inventors: Stephen O. Lemay, San Francisco, CA (US); Scott Forstall, Mountain View, CA (US); Greg Christie, San Jose, CA (US); Bas Ording, San Francisco, CA (US); Imran Chaudhri, San Francisco, CA (US); Marcel Van Os, San Francisco, CO (US); Freddy Allen Anzures, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 672 days.

(21) Appl. No.: 12/547,401

(22) Filed: Aug. 25, 2009

(65) Prior Publication Data

US 2009/0327920 A1 Dec. 31, 2009

Related U.S. Application Data

(63) Continuation of application No. 11/459,591, filed on Jul. 24, 2006, now Pat. No. 7,596,761.

(60) Provisional application No. 60/756,832, filed on Jan. 5, 2006.

(51) Int. Cl.
*G06F 3/048* (2013.01)

(52) U.S. Cl.
USPC ............................ 715/854; 715/817; 715/779

(58) Field of Classification Search
USPC ......... 715/751, 752, 764, 779, 810, 817, 818, 715/819, 820, 853, 854, 855
See application file for complete search history.

(56) References Cited

U.S. PATENT DOCUMENTS

| 6,236,400 | B1 | 5/2001 | Guerrero | 345/356 |
|---|---|---|---|---|
| 6,362,837 | B1 * | 3/2002 | Ginn | 715/751 |
| 6,515,681 | B1 * | 2/2003 | Knight | 715/751 |
| 7,191,411 | B2 | 3/2007 | Moehrle | 715/855 |
| 7,240,297 | B1 * | 7/2007 | Anderson et al. | 715/854 |
| 7,441,207 | B2 * | 10/2008 | Filner et al. | 715/864 |
| 2004/0055446 | A1 | 3/2004 | Robbin et al. | 84/615 |
| 2005/0134578 | A1 | 6/2005 | Chambers et al. | 345/184 |

(Continued)

OTHER PUBLICATIONS

Birkholz, J. "Announcements about the MediaWiki software and site admin list," printed Dec. 4, 2005, 9 pages, http:///66.102.7.104/search?q=cache:-sDpKORF5WoJ:blog.gmane.org/g.

(Continued)

*Primary Examiner* — Rashawn Tillery
(74) *Attorney, Agent, or Firm* — Morgan, Lewis & Bockius LLP

(57) ABSTRACT

A graphical user interface for a portable electronic device includes an application display region that displays a current application context of an application and a navigation bar adjacent to the application display region. The navigation bar includes two horizontally adjacent regions, comprising a current context region for displaying an indicator of the current application context and a prior context region for displaying an indicator of an application context preceding the current application context. The application display region simulates shifting of the application display in a first direction upon detecting user selection of the prior context region, and simulates shifting of the application display in a second direction, opposite the first direction, upon detecting user selection of an application context different from the current application context and the prior application context.

24 Claims, 12 Drawing Sheets

(56) References Cited

U.S. PATENT DOCUMENTS

| | | | |
|---|---|---|---|
| 2005/0144568 A1* | 6/2005 | Gruen et al. | 715/822 |
| 2005/0160372 A1* | 7/2005 | Gruen et al. | 715/810 |
| 2005/0210412 A1* | 9/2005 | Matthews et al. | 715/835 |
| 2006/0085766 A1* | 4/2006 | Dominowska et al. | 715/854 |
| 2006/0271864 A1 | 11/2006 | Satterfield et al. | 715/764 |
| 2006/0271867 A1 | 11/2006 | Wang et al. | 715/764 |

OTHER PUBLICATIONS

Butler, T, "Portable MP3: The Nomad Jukebox," Jan. 8, 2001, 6 pages, http://db.tidbits.com/article/6261.

Butler, T. "Archon Jukebox 6000 Challenges Nomad Jukebox," Aug. 13, 2001, 7 pages, http://db.tidbits.com/getbits.acgi?tbart=06521.

Connecticut Education & Training Connection, "Education & Training, Help Index," printed Dec. 31, 2007, 14 page, http://wwwl.ctdol.state.ct.us/etc/help.asp?IntHelpTopic=All.

Engst, A., "SoundJam Keeps on Jammin," Jun. 19, 2000, 5 pages, http://db.tidbits.com/article/5988.

Tidwell, J., "Animated Transition," from Designing Interfaces, pp. 84-85, Copyright © 2006 O'Reilly Media, Inc.

Office Action dated Jul. 29, 2008, received in related U.S. Appl. No. 11/459,591.

Office Action dated Jan. 13, 2009, in related U.S. Appl. No. 11/459,591.

* cited by examiner

APPLICATION USER INTERFACE WITH NAVIGATION BAR SHOWING CURRENT AND PRIOR APPLICATION CONTEXTS

RELATED APPLICATIONS

This application is a continuation of U.S. patent application Ser. No. 11/459,591, filed Jul. 24, 2006 now U.S. Pat. No. 7,596,761, which claims priority to U.S. Provisional Patent Application No. 60/756,832, filed Jan. 5, 2006, entitled "Application User Interface with Navigation Bar Showing Current and Prior Application Contexts," which applications are incorporated by reference herein in their entirety.

TECHNICAL FIELD

The disclosed embodiments relate generally to user interfaces, and more particularly, to an application user interface with a navigation bar for use in a portable electronic device.

BACKGROUND

Portable electronic devices, such as mobile phones, personal digital assistants (PDAs), etc., can include a multitude of applications. Through these applications, a user can perform many functions on the device. The user interacts with these applications via the user interfaces of the applications. The user interface is the gateway through which users receive not only content but also responses to user actions or behaviors, including user attempts to access a device's features or tools. The user interface, therefore, is an integral part in the design of these applications and helps determine the ease of use, and thus the quality of the overall user experience, of such devices.

One challenge in the design of user interfaces for applications in portable devices involves navigation within an application. Applications in conventional devices often do not provide sensory feedback to the user regarding which contexts of the application the user has recently used. Furthermore, whenever a user backtracks through the contexts of an application, the application often does not remind the user of the context to which he or she is backtracking. This lack of sensory feedback can be frustrating for a user who gets lost in the menu structure of an application and wishes to know where he or she is in the application.

Accordingly, there is a need for improved techniques for navigating within an application in a portable electronic device.

SUMMARY

The above deficiencies and other problems associated with user interfaces for portable devices are reduced or eliminated by including a navigation bar in these user interfaces.

A current application context of an application is displayed in an application display region of a display in a portable device. A navigation bar is displayed adjacent to the application display region. In some embodiments, the navigation bar includes at least three horizontally adjacent regions, including a current context region for displaying an indicator of a second application context, a prior context region for displaying an indicator of a first application context, and a link region for displaying an indicator of a third application context. Upon detection of user selection of the prior context region, operation is shifted to the first application context, including displaying in the prior context region of the navigation bar a fourth application context. The fourth application context includes an application context, if any, that preceded the first application context. Upon detection of user selection of the link region, operation is shifted to the third application context, including displaying in the prior context region of the navigation bar an indicator of the second application context.

In some embodiments, the navigation bar includes only the current context region and the prior context region.

In some embodiments, the shifting operation includes simulating shifting of the application display region in a first direction upon detecting user selection of the prior context region, and includes simulating shifting of the application display region in a second direction, opposite the first direction, upon detecting user selection of the link region. The first direction may be to the right and the second direction may be to the left.

In another embodiment, a current application context of a first application is displayed in an application display region of a display of a portable device, the device having a menu button distinct from the display. A navigation bar is displayed adjacent to the application display region. The navigation bar includes at least three horizontally adjacent regions, including the prior context region and the link region. Upon detection of user selection of the prior context region, operation of the device is shifted to the first application context within the first application. Upon detection of user selection of the link region, operation of the device is shifted to the second application context within the first application. Upon detection of user selection of the menu button, operation of the device is shifted to the application selection context for selecting any of a predefined set of applications, including a plurality of second applications.

In another embodiment, a current application context of an application is displayed in an application display region of a display of a portable device. The navigation bar, including a list of indicators of recently navigated application contexts of the application including an indicator of the current application context, is displayed adjacent to the application display region. Upon detection of user navigation to the first application context corresponding to the application context preceding the current application context, operation is shifted to the first application context and the indicator of the current application context is removed from the list. Upon detection of user navigation of the second application context corresponding to an application context succeeding the current application context, operation is shifted to the second application context and an indicator of the second application context is appended to the list and displayed in the navigation bar.

The aforementioned methods may be performed by a portable electronic device having a touch-sensitive display with a graphical user interface (GUI), one or more processors, memory and one or more modules, programs or sets of instructions stored in the memory for performing these methods. In some embodiments, the portable electronic device provides a plurality of functions, including wireless communication.

Instructions for performing the aforementioned methods may be included in a computer program product configured for execution by one or more processors.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Embodiments for displaying a current application context in an application region of a display in a device are described. The display may be in a portable device. The display may be a touch-sensitive display. In one embodiment, a navigation bar is displayed adjacent to an application display region. In some embodiments, the navigation bar includes at least three horizontally adjacent context regions for displaying indicators of application contexts, including a current application context region, a prior context region, and a succeeding context region. The prior context region includes a first link region for displaying an indicator of one or more prior application contexts. The succeeding context region includes a second link region for displaying an indicator of one or more additional application contexts. The user navigates through the application contexts by selection of an appropriate context region. The navigation bar is updated accordingly, including displaying links to one or more prior or additional application contexts.

In some embodiments, the user may navigate using a menu button that is distinct from the display. Upon detection of user selection of the menu button, operation of the device is shifted to an application selection context for selecting any of a predefined set of applications, including a plurality of additional applications.

Figure 1:
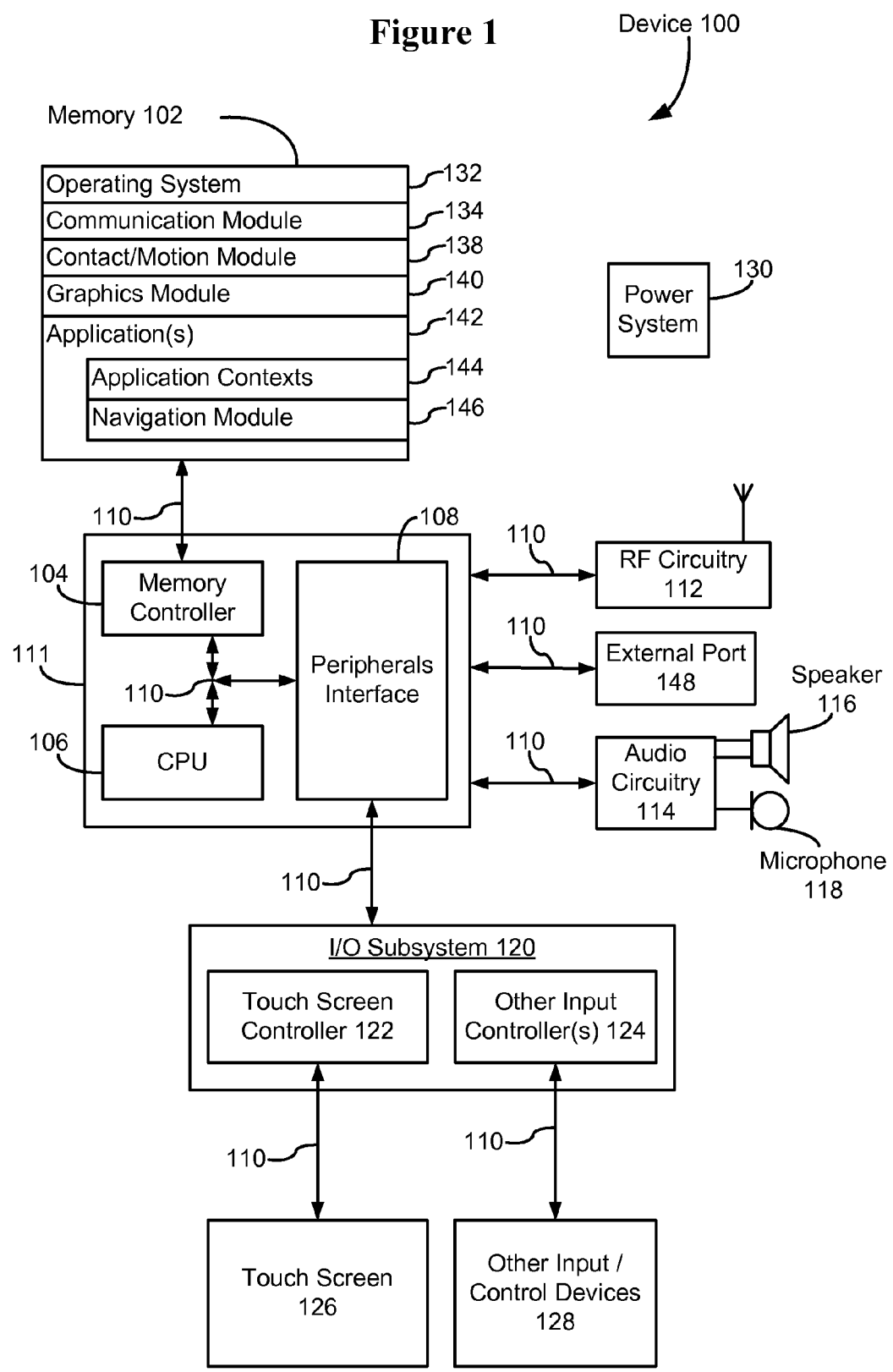
FIG. 1 is a block diagram illustrating a portable electronic device, according to some embodiments of the invention.

Attention is now directed towards embodiments of the methods and the related hardware for implementing them. FIG. 1 is a block diagram illustrating a portable electronic device, according to some embodiments of the invention. The device 100 includes a memory 102, a memory controller 104, one or more processing units (CPU's) 106, a peripherals interface 108, RF circuitry 112, audio circuitry 114, a speaker 116, a microphone 118, an input/output (I/O) subsystem 120, a touch screen 126, other input or control devices 128 and an external port 148. These components communicate over the one or more buses 110, which may include a combination of data lines, address lines, and control signals. The device 100 can be any portable electronic device, including but not limited to a handheld computer, a tablet computer, a mobile phone, a media player, a personal digital assistant (PDA), or the like, including a combination of two or more of these items. It should be appreciated that the device 100 is only one example of a portable electronic device 100, and that the device 100 may have more or fewer components than shown, or a different configuration of components. The various components shown in FIG. 1 may be implemented in hardware, software or a combination of both hardware and software, including one or more signal processing and/or application specific integrated circuits.

The memory 102 may include high speed random access memory or other volatile memory and may also include non-volatile memory, such as one or more magnetic disk storage devices, flash memory devices, or other non-volatile solid state memory devices. In some embodiments, the memory 102 may further include storage remotely located from the one or more processors 106, for instance network attached storage accessed via the RF circuitry 112 or external port 148 and a communications network (not shown) such as the Internet, intranet(s), Local Area Networks (LANs), Wide Local Area Networks (WLANs), Storage Area Networks (SANs) and the like, or any suitable combination thereof. Access to the memory 102 by other components of the device 100, such as the CPU 106 and the peripherals interface 108, may be controlled by the memory controller 104.

The peripherals interface 108 couples the input and output peripherals of the device to the CPU 106 and the memory 102. The one or more processors 106 run various software programs and/or sets of instructions stored in the memory 102 to perform various functions for the device 100 and to process data.

In some embodiments, the peripherals interface 108, the CPU 106, and the memory controller 104 may be implemented on a single chip, such as a chip 111. In some other embodiments, they may be implemented on separate chips.

The RF (radio frequency) circuitry 112 receives and sends electromagnetic waves. The RF circuitry 112 converts electrical signals to/from electromagnetic waves and communicates with communications networks and other electronic devices via the electromagnetic waves. The RF circuitry 112 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 112 may communicate with the networks, such as the Internet, also referred to as the World Wide Web (WWW), an Intranet and/or a wireless network, such as a cellular telephone network, a wireless local area network (LAN) and/or a metropolitan area network (MAN), and other devices by wireless communication. The wireless communication may use any of a plurality of communications standards and technologies that are well known in the art, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., 802.11a, 802.11b, 802.11g and/or 802.11n standards), voice over Internet Protocol (VoIP), Wi-MAX, a protocol for email, instant messaging, and/or a short message service (SMS), or any other suitable communication protocol, including communication protocols not yet developed as of the filing date of this document.

The audio circuitry 114, the speaker 116, and the microphone 118 provide an audio interface between a user and the device 100. The audio circuitry 114 receives audio data from the peripherals interface 108, converts the audio data to an electrical signal, and transmits the electrical signal to the speaker 116. The speaker converts the electrical signal to human-audible sound waves. The audio circuitry 114 also receives electrical signals converted by the microphone 116 from sound waves. The audio circuitry 114 converts the electrical signal to audio data and transmits the audio data to the peripherals interface 108 for processing. Audio data may be may be retrieved from and/or transmitted to the memory 102 and/or the RF circuitry 112 by the peripherals interface 108. In some embodiments, the audio circuitry 114 also includes a headset jack (not shown). The headset jack provides an interface between the audio circuitry 114 and removable audio input/output peripherals, such as output-only headphones or a headset with both output (headphone for one or both ears) and input (microphone).

The I/O subsystem 120 provides the interface between input/output peripherals on the device 100, such as the touch screen 126 and other input/control devices 128, and the peripherals interface 108. The I/O subsystem 120 includes a touch screen controller 122 and one or more input controllers 124 for other input or control devices. The one or more input controllers 124 receives/sends electrical signals from/to other input or control devices 128. The other input/control devices 128 may include physical buttons (e.g., push buttons, rocker buttons, 5-way navigation buttons, etc.), dials, slider switches, sticks, and so forth.

The touch screen 126 provides both an output interface and an input interface between the device and a user. The touch screen controller 122 receives/sends electrical signals from/to the touch screen 126. The touch screen 126 displays visual output to the user. The visual output may include text, graphics, video, and any combination thereof. Some or all of the visual output may correspond to user-interface objects, further details of which are described below.

The touch screen 126 may also accept input from the user based on haptic and/or tactile contact. The touch screen 126 forms a touch-sensitive surface that accepts user input. The touch screen 126 and the touch screen controller 122 (along with any associated modules and/or sets of instructions in the memory 102) detects contact (and any movement or release of the contact) on the touch screen 126 and converts the detected contact into interaction with user-interface objects that are displayed on the touch screen. In an exemplary embodiment, a point of contact between the touch screen 126 and the user corresponds to one or more digits of the user. The touch screen 126 may use LCD (liquid crystal display) technology, or LPD (light emitting polymer display) technology, although other display technologies may be used in other embodiments. The touch screen 126 and touch screen controller 122 may detect contact and any movement or release thereof using any of a plurality of touch sensitivity technologies that are well known in the art, including but not limited to capacitive, resistive, infrared, and surface acoustic wave technologies, as well as other proximity sensor arrays or other elements for determining one or more points of contact with the touch screen 126. The touch-sensitive display may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, the touch screen 126 displays visual output from the portable device, whereas touch sensitive tablets do not provide visual output. The touch screen 126 may have a resolution in excess of 100 dpi. In an exemplary embodiment, the touch screen 126 may have a resolution of approximately 168 dpi. The user may make contact with the touch screen 126 using any suitable object or appendage, such as a finger, stylus, pen, etc.

User-interface objects are objects that may be displayed on the touch screen 126, which correspond to a user interface of the device 100. User-interface objects may include non-interactive objects that may convey information and/or contribute to the look and feel of the user interface, and interactive objects that convey information, contribute to the look and feel of the user interface, and/or activate or deactivate a device function upon interaction by the user. A user interacts with the interactive user-interface objects by making, moving, and/or releasing contact with the touch screen at locations corresponding to the areas of the objects with which she wishes to interact. Examples of user-interface objects include, without limitation, soft keys (also called "soft buttons" or "virtual buttons"), pull-down menus, scroll bars, icons, radio buttons, check boxes, text boxes, cursors, and so forth.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 126 or an extension of the touch-sensitive surface formed by the touch screen 126.

The device 100 also includes a power system 130 for powering the various components. The power system 130 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some other embodiments, the display 126 may not be touch-sensitive. In these embodiments, the touch screen controller 122 may be omitted and a user of the device may use the other input/control devices 128 to interact with the device.

In some embodiments, the software components include an operating system 132, a communication module (or set of instructions) 134, a contact/motion module (or set of instructions) 138, a graphics module (or set of instructions) 140, and one or more applications (or set of instructions) 142.

The operating system 132 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 134 facilitates communication with other devices over one or more external ports 148 and also includes various software components for handling data received by the RF circuitry 112 and/or the external port 148. The external port 148 (e.g., Universal Serial Bus (USB), FIREWIRE, etc.) is adapted for coupling directly to other devices or indirectly over a network (e.g., the Internet, wireless LAN, etc.).

The contact/motion module 138 detects contact with the touch screen 126, in conjunction with the touch screen controller 122. The contact/motion module 138 includes various software components for performing various operations related to detection of contact with the touch screen 122, such as determining if contact has occurred, determining if there is movement of the contact and tracking the movement across the touch screen, and determining if the contact has been released (i.e., if the contact has ceased). In some embodiments, the contact/motion module 126 and the touch screen controller 122 also detects contact on the touchpad.

The graphics module 140 includes various known software components for rendering and displaying graphics on the touch screen 126. Note that the term "graphics" includes any object that can be displayed to a user, including without limitation text, web pages, icons (such as user-interface objects including soft keys), digital images, videos, animations and the like.

The one or more applications 142 can include any applications installed on the device 100, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc. In some embodiments, each application includes one or more application contexts 144.

One or more navigation modules (or set of instructions) 146 manage the navigation between application contexts 144. In some embodiments, each application includes its own navigation module 146. In other embodiments, all of the applications share a common navigation module 146. The navigation module 146 may maintain a list of recently navigated application contexts within an application, or some other form of navigation history. The navigation module 146 also may display a navigation bar on the touch screen 126 and/or a display. The navigation bar may include at least a portion of the list of recently navigated application contexts 144 within whichever application is active at the moment.

In some embodiments, the device 100 may include the functionality of an MP3 player, such as an iPod (trademark of Apple Computer, Inc.). The device 100 may, therefore, include a 36-pin connector that is compatible with the iPod. In some embodiments, the device 100 may include one or more optional optical sensors (not shown), such as CMOS or CCD image sensors, for use in imaging applications.

In some embodiments, a touchpad, when touched by the user, navigates the device 100 to a main, home, or root menu from any user interface or application context 144 that is active on the device 100. In such embodiments, the touchpad may be referred to as a "menu button." In some other embodiments, the menu button may be a physical push button or other physical input/control device, or even a predefined soft key on the touch screen, instead of a touchpad.

Attention is now directed towards embodiments of processes for providing application contexts 144. An application includes one or more application contexts 144. Each application context 144 of an application includes a user interface of the application that allows the user to activate or deactivate a predefined set of operations on the device 100 and navigate to a predefined set of other application contexts within the application. The history of a user's navigation between application contexts 144 may be maintained in a navigation history or log. In some embodiments, the navigation history is a list of navigated-to contexts. The navigation history includes indicators of the contexts to which the user has navigated in the interval during which the application is continuously active (hereinafter the "application session," from the time when the application was activated up to and including the currently active context). In some embodiments, the navigation history is cleared (e.g., by removing the list from memory) when the application session ends. In some embodiments, when the same application is activated at another time, the navigation history for that application session does not include the navigation history from past sessions. Instead, a new list is generated for each application session.

At any time in which an application 142 is active in the device 100, an application context 144 is active within the application. That context is the current application context (hereinafter "current context"). Application contexts preceding the current context in the navigation history are the preceding application contexts (hereinafter "preceding context"). An application context to which a user navigates from the current context, but which is not one of the preceding contexts in the navigation history, is a succeeding application context (hereinafter "succeeding context"). Whenever a user navigates to a succeeding context, that succeeding context becomes the new current context (and added to the navigation history) and the formerly current context becomes a preceding context. Whenever a user navigates to a preceding context, that preceding context becomes the new current context.

In some embodiments, indicators may be removed from the navigation history as the user navigates to preceding contexts (backtracks) within the history. For example, if a user backtracks from current context A to a preceding context B, indicators of the contexts in the history between context A and context B, including context A, are removed from the history.

In some embodiments, the navigation history may be analogized to a last-in, first-out (e.g., a stack) data structure. The current context is always the topmost element of the stack. Whenever a user navigates to a succeeding context, an indicator of the succeeding context is pushed onto the navigation history "stack" as the new current context. Whenever a user navigates to an immediately preceding context, an indicator of the formerly current context is popped off of the stack and the indicator of the preceding context, as the new current context, is the new topmost element in the navigation history "stack."

It should be appreciated that when an application 142 is activated, the application may default to an initial context. That initial context is the initial current context. Since there is no previous context to which the user has navigated within the same application session, the navigation history includes no preceding contexts and includes only the initial context as the current context, until the user navigates to any succeeding context.

In some embodiments, the "main menu" may be an application selection context from which a user may select an application from a plurality of applications. Upon the user selection of a respective application, the device 100 activates (runs) the selected application and displays a user interface of the selected application on a display, such as the touch screen 126. The application selection context may include graphical representations (e.g., icons) of the applications, a textual list of the applications, or any combination thereof. The user selects an application by selecting the graphical representation or the textual indicator of the desired application.

Figure 2:
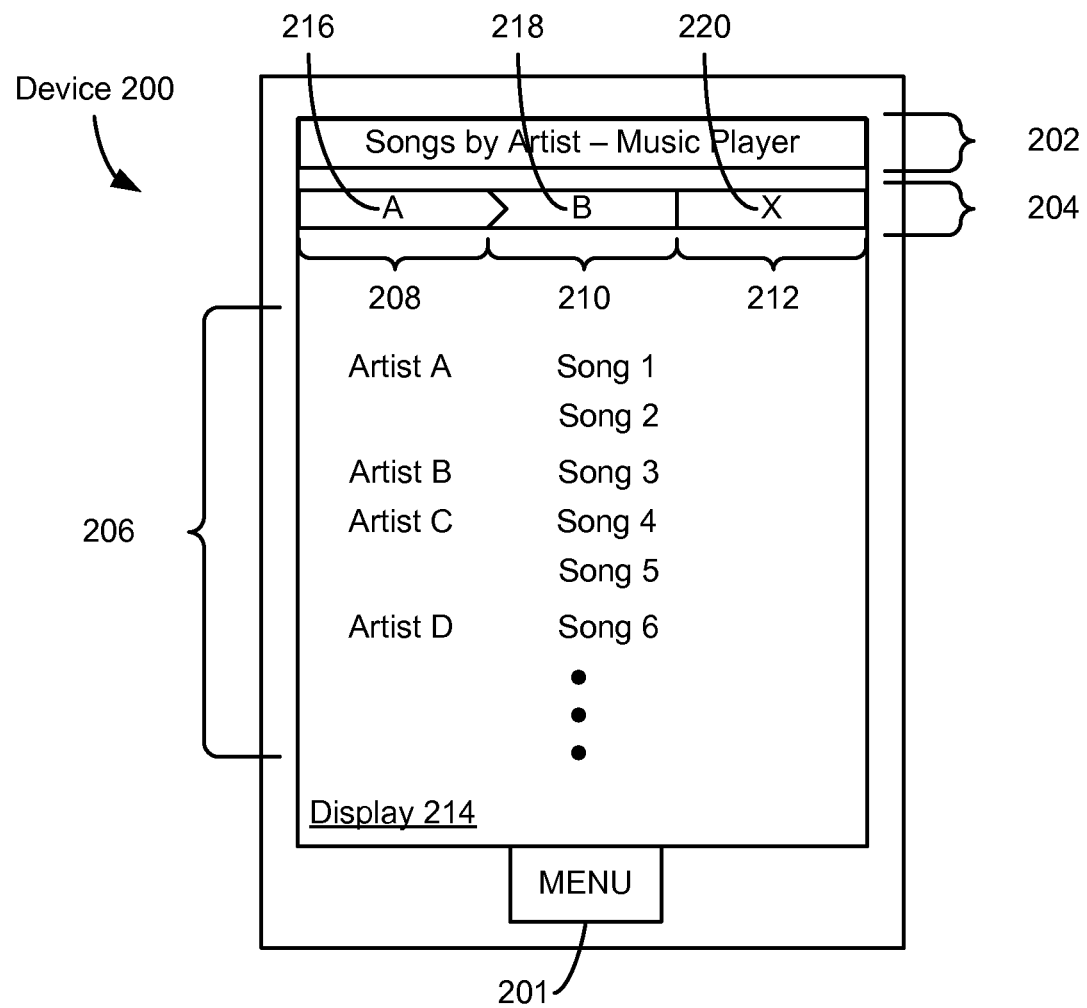
FIG. 2 is a diagram illustrating a display, according to some embodiments of the invention.

FIG. 2 is a diagram illustrating a display 214 showing an application context and a navigation bar, according to some embodiments of the invention. A device 200 includes the display 214 with a GUI. In some embodiments, the display 214 is a touch screen and the user may interact with the user interfaces of the application contexts and make selections by making contact with the touch screen. In other embodiments, the display 214 is not touch sensitive and the user may interact with the user interfaces and make selections via other input/control devices, such as push buttons, 5-way navigation buttons, and so forth. In some embodiments, the device 200 also includes a menu button 201, which may be a touchpad, physical button, or any other suitable input/control device.

An application context of an application may be displayed in the display 214. The application context that is displayed in the display 214 is the current context. A title bar 202 may be displayed to display labels of the active application and/or of the current context. An exemplary current context 206 for device 200 is a list within a music player application of songs organized by artist. It should be appreciated that the application contexts shown for the device 200 and in subsequent embodiments are merely exemplary. Applications and application contexts may take many different forms and be associated with a wide variety of functions and operations.

A navigation bar 204 may also be displayed. The navigation bar 204 shows at least a portion of the navigation history for the current application session. The portion of the navigation history that is shown includes the current context and up to a predefined number of preceding contexts, starting with the immediately preceding context and continuing on sequentially, in the order as recorded in the navigation history. In some embodiments, the navigation bar only shows indicators of the current context and of the immediately preceding context.

In some embodiments, the navigation bar includes three regions: a prior context region, a current context region, and a link region. Each region includes an indicator or label for a context. The current context region 210 displays an indicator or label 218 for the current context 206.

The prior context region 208 displays an indicator or label 216 for the immediately preceding context (i.e., the application context that was last active before the user navigated to the current context). The user may select the prior context region 208 (e.g., if the display 214 is a touch screen, by touching the display 214 at the location of the prior context region 208) to navigate to the application context indicated by the label 216, namely to the immediately preceding context. Upon selection of the prior context region 208, the device 200 shifts operation to the immediately preceding context; and the immediately preceding context is activated. The preceding context becomes the new current context.

The link region 212 displays an indicator or label 220 for a predefined application context. The user may select the link region 212 (e.g., if the display 214 is a touch screen, by touching the display 214 at the location of the link region 212) to navigate to the predefined application context, which is indicated by the label 220. Upon selection of the link region 212, the device 200 shifts operation to (activates) the predefined application context and that predefined application context becomes the new current context. In some embodiments, the predefined application context to which the link region 212 links may vary based on what the current context is, what other contexts were active before the current application context, what other contexts are running in the background, and any combination thereof. That is, the link region 212 may be a context sensitive link to an application context, and the application context to which the link region 212 is linked changes based on the where the user is in the application. For example, in a music player application, the link region 212 may be linked to a player that controls context for a song if that song is playing in the background and to a music player options context if no song is playing at all. In some embodiments, for email and other messaging applications, link region 212 may contain "Previous" and "Next" icons for cycling through messages in a current mailbox context.

Whenever a user first activates an application on the device 200, the application automatically displays an initial context as the current context. Since that is the first context within the application that is active, there is no preceding context that can be shown in the prior context region 208. In such circumstances, the prior context region 208 maybe omitted from the navigation bar 204. The current context region 210 and the link region 212 may be resized to occupy the navigation bar area left unoccupied by the absence of the prior context region.

Figure 3:
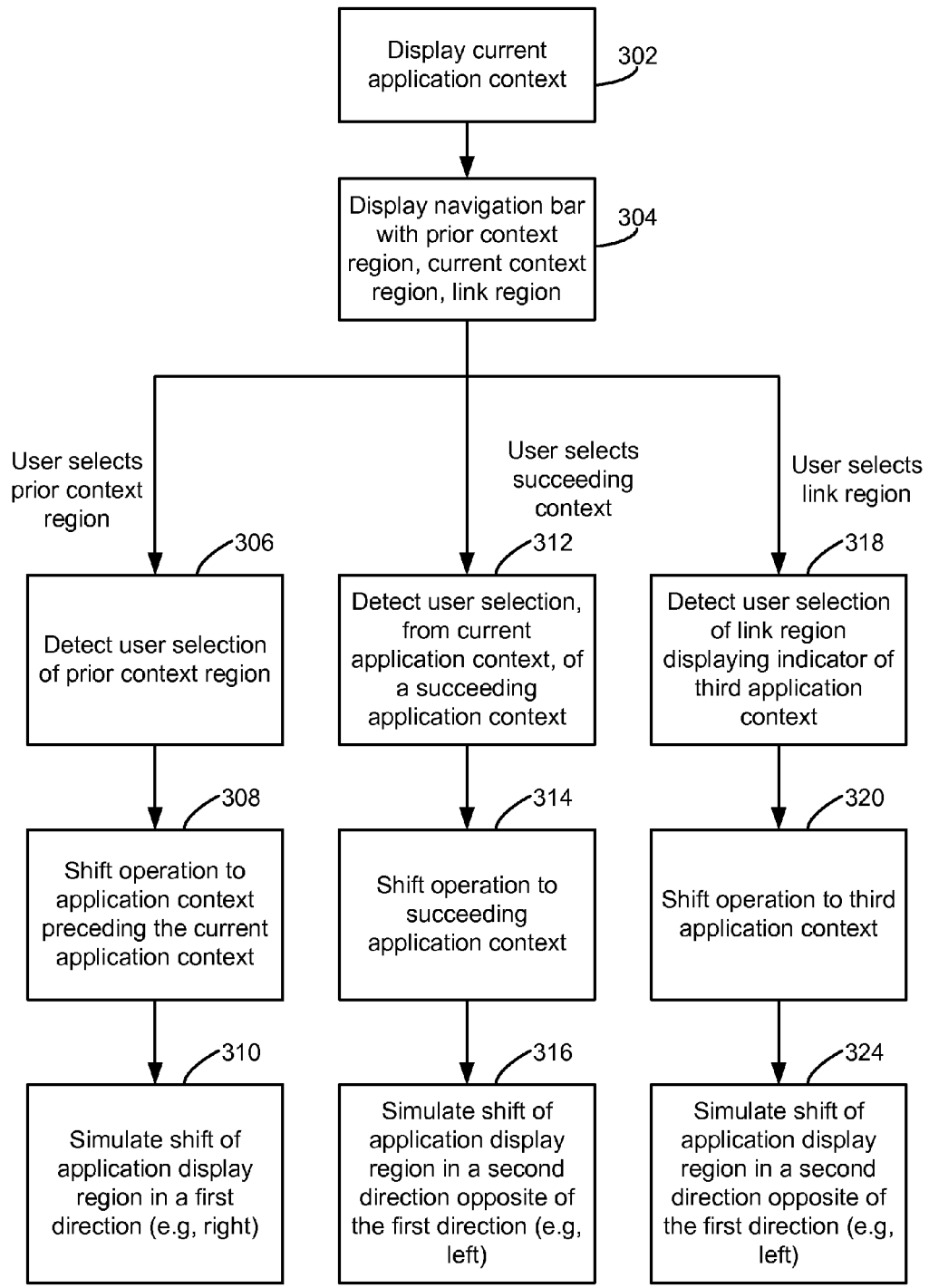
FIGS. 3-5 are flow diagrams illustrating processes for navigating between application contexts of an application in a device, according to some embodiments of the invention.

FIG. 3 is a flow diagram illustrating a process for navigating between application contexts of an application in a device, according to some embodiments of the invention. The current context of an application is displayed (302). The device is operating in the displayed current context. A navigation bar is displayed (304) with a prior context region, a current context region, and a link region. A user may select the prior context region or the link region from the navigation bar, or select an object in the current context that shifts operation of the device to a succeeding context. In some embodiments, the navigation bar is not displayed (e.g., the navigation bar fades out, hides, or otherwise becomes invisible) if the touchscreen has not been touched for a predetermined time, but the navigation bar reappears and is displayed when the touchscreen is touched. For example, if the application is a web browser, the navigation bar may fade out after 2-5 seconds, thereby allowing the touchscreen to display more of a web page until the user touches the screen again.

If the user selects the prior context region, the device detects the selection of the prior context region (306). The device shifts operation to the application context indicated in the prior context region, which is the immediately preceding context (308). The device also simulates shifting of the application display in a first direction (310). In some embodiments, that first direction is to the right. That is, the user interface of the preceding context slides into the display from the left side of the display, simulating the effect of the display as a rightward sliding window.

If the user selects an object in the current application context that shifts operation of the device to a succeeding context, the device detects that selection (312). The device shifts operation to that succeeding context (314). The device also simulates shifting of the application display in a second direction that is opposite from the first direction described above (316). In some embodiments, that second direction is to the left. That is, the user interface of the succeeding context slides into the display from the right side of the display, simulating the effect of the display as a leftward sliding window.

If the user selects the link region, the device detects that selection (318). The device shifts operation to the predefined application context indicated in the link region (320). The device also simulates shifting of the application display in a second direction that is opposite from the first direction described above (324). In some embodiments, that second direction is to the left. That is, the user interface of the predefined application context slides into the display from the right side of the display, simulating the effect of the display as a leftward sliding window.

Figure 4:
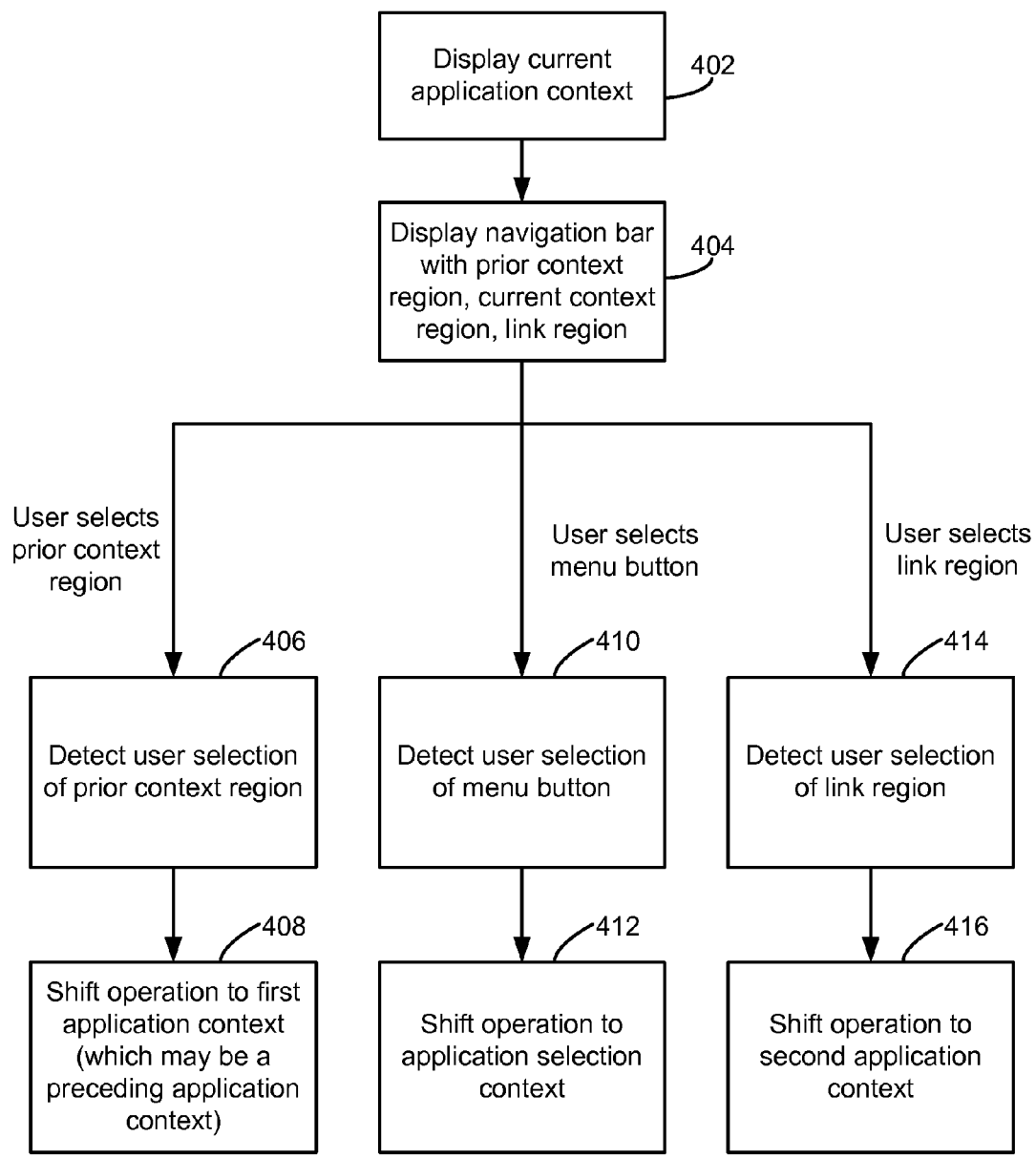

FIG. 4 is a flow diagram illustrating a second process for navigating between application contexts of an application in a device, according to some embodiments of the invention. The current context of an active application is displayed (402). In some embodiments, the device also includes a menu button. A navigation bar, which includes a prior context region, a current context region, and a link region, is displayed (404). At this point, a user may select the prior context region, the link region, or the menu button.

If the user selects the prior context region, the device detects that selection (406). The device shifts operation to a first application context indicated in the prior context region (408). In some embodiments, that first application context is the immediately preceding context. In some embodiments, the device also simulates shifting of the application display in a first direction, similar to operation 310 (FIG. 3).

If the user selects the link region, the device detects that selection (414). The device shifts operation to a second application context indicated in the link region (416). In some embodiments, that second application context is a predefined application context of the active application. In some embodiments, the device also simulates shifting of the application display in a second direction that is opposite of the first direction, similar to operation 324 as described above.

If the user selects the menu button, the device detects that selection (410). The device shifts operation to an application selection context (412). In some embodiments, the active application is deactivated as part of the shift of operation to the application selection context. In some other embodiments, the active application continues running in the background while the application selection context is active. A user interface of the application selection context is displayed. From the application selection context, the user may select and activate an application from a plurality of applications. The plurality of applications may be represented in the application selection context by graphical representation (e.g., icons), text, or a combination thereof.

Figure 5:
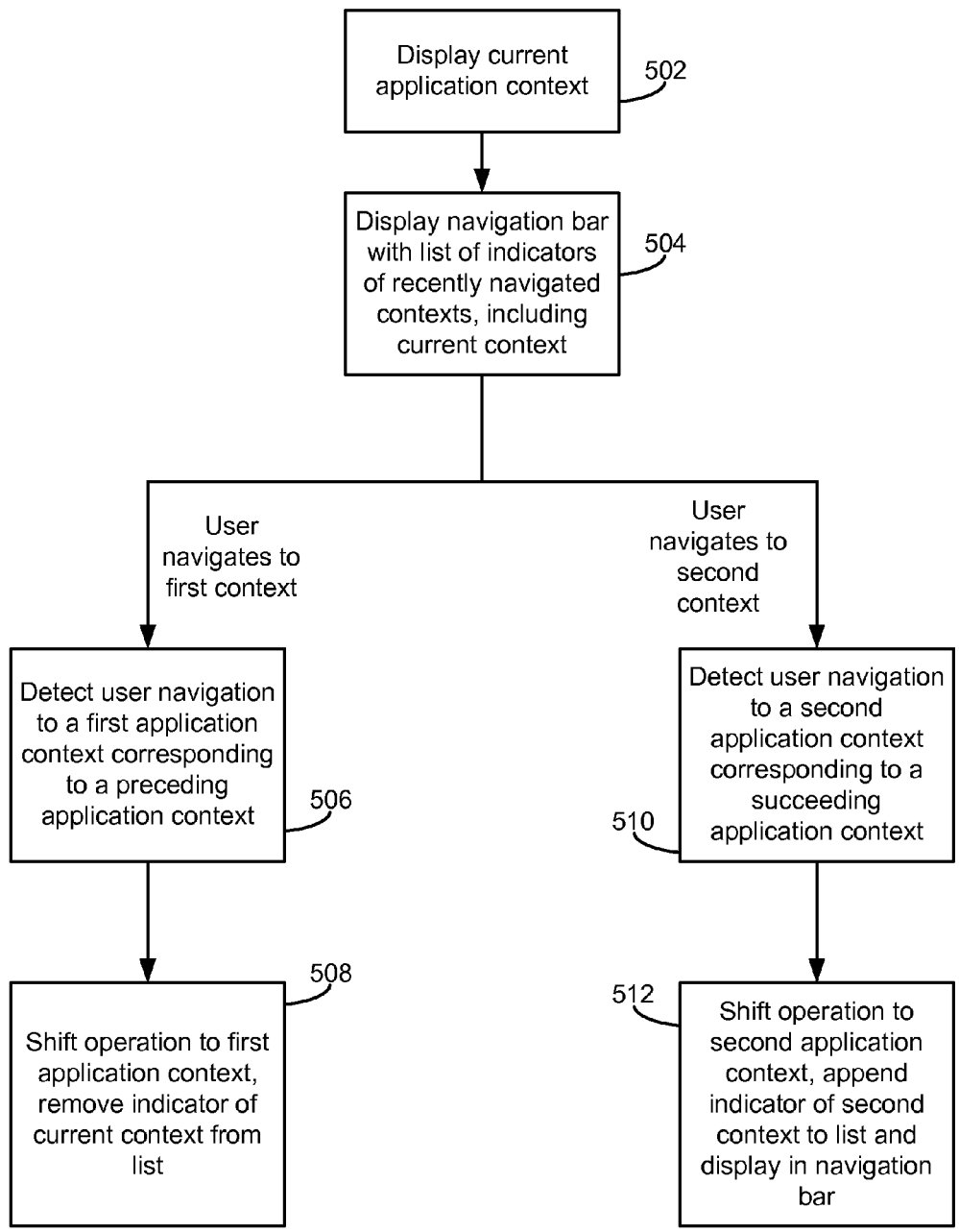

FIG. 5 is a flow diagram illustrating a third process for navigating between application contexts of an application in a device, according to some embodiments of the invention. The device displays a current application context of an active application (502). A navigation bar is displayed (504). The navigation bar displays at least a portion of a list of indicators of application contexts to which the user had navigated during the current interval in which the application is continuously active. In some embodiments, that list is the navigation history. In some embodiments, the displayed portion of the list includes the current application context. At this point, the user may navigate to other application contexts.

If the user navigates to a first application context that corresponds to a preceding application context, the device detects the navigation to that first context (506). The device shifts operation to that first application context and removes the indicator of the current application context from the list of application context indicators and from the navigation bar (508). The first application context becomes the "new" current application context.

If the user navigates to a second application context that corresponds to a succeeding application context, the device detects the navigation to that second context (510). The device shifts operation to that second application context and appends an indicator of the second application context to the list of application context indicators (512). The indicator of the second application context is displayed in the navigation bar, as the second application context becomes the "new" current application context.

Figure 6A:
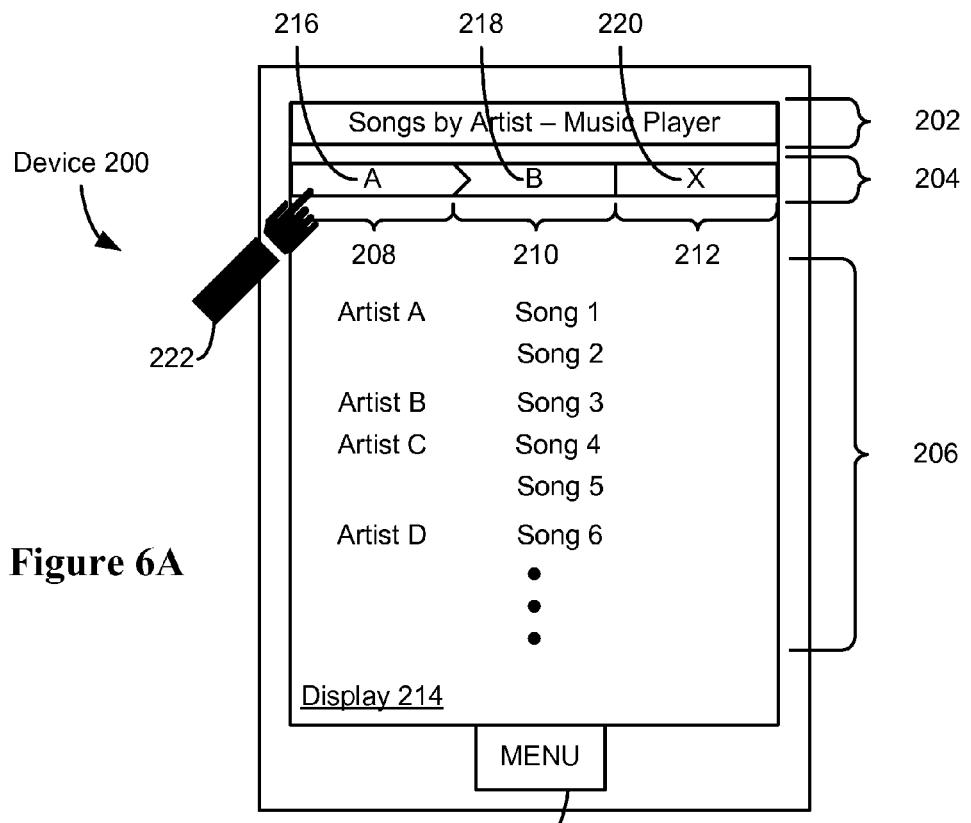
FIGS. 6A-6C are diagrams illustrating navigation to a preceding application context of an application, according to some embodiments of the invention.
Figure 6B:
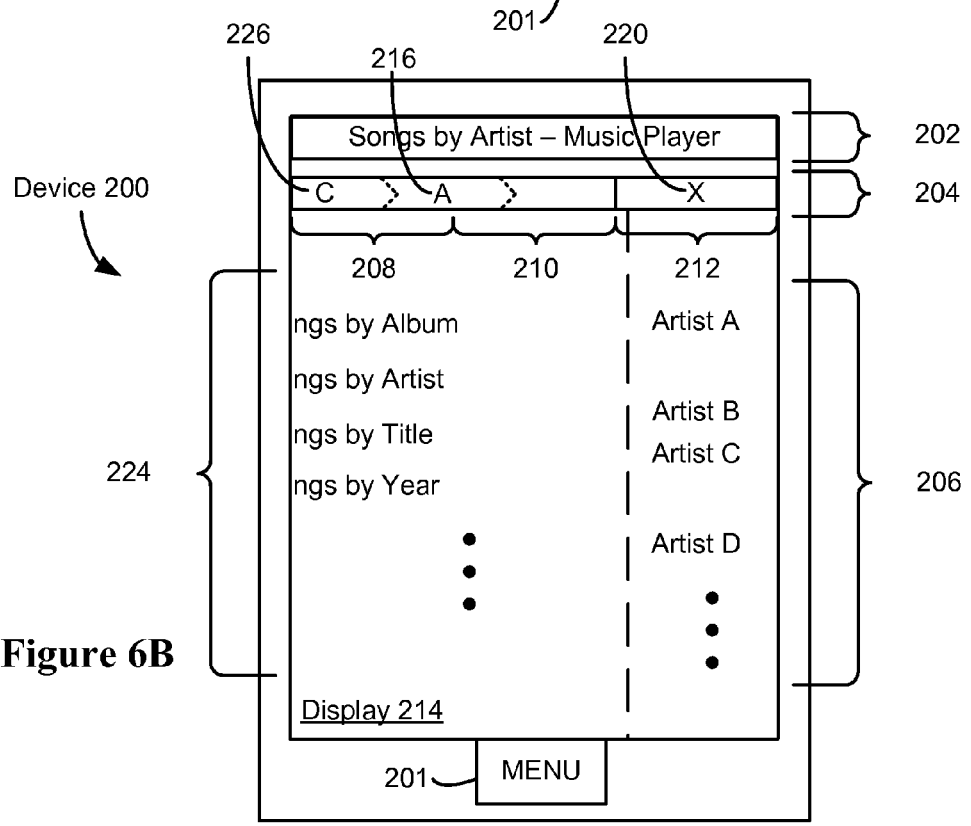
Figure 6C:
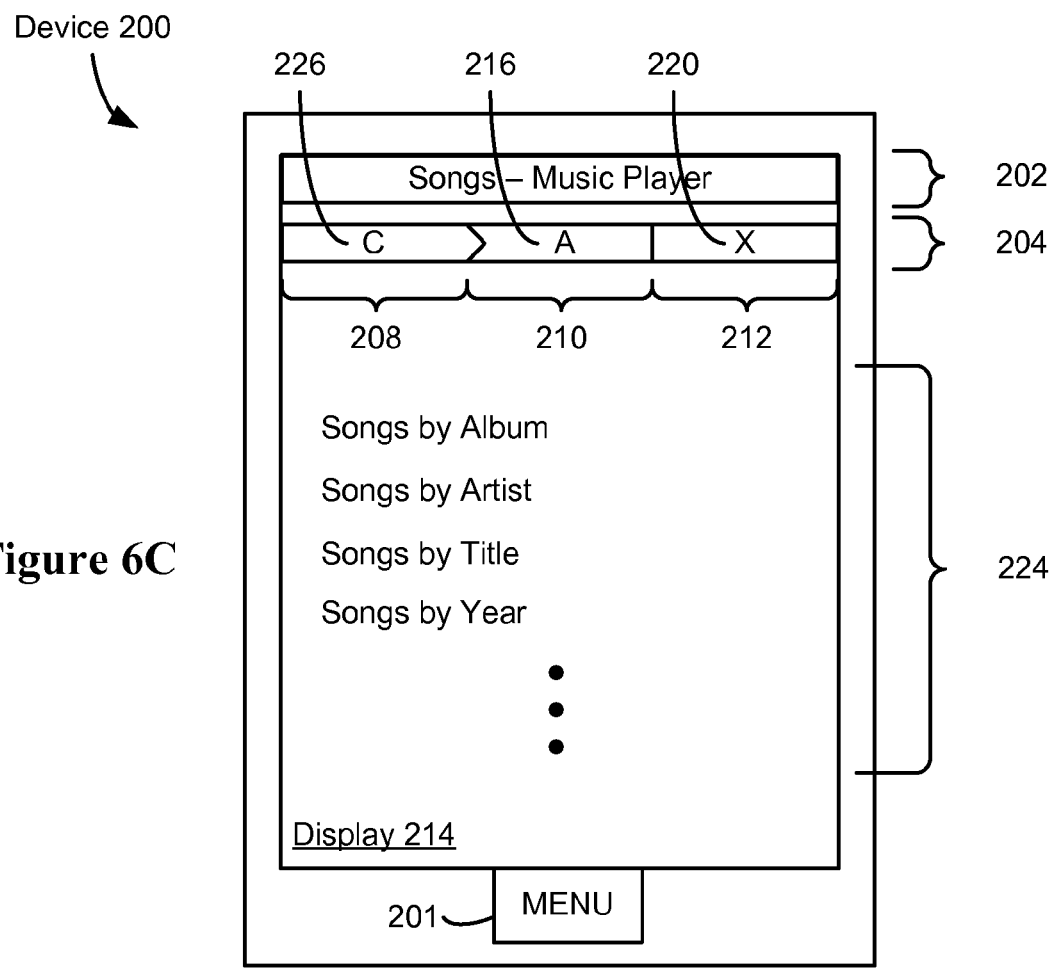

Attention is now directed towards embodiments of navigating to different application contexts. FIGS. 6A-6C are diagrams illustrating navigation to a preceding application context of an application, according to some embodiments of the invention. Continuing with the music player application example described above, in relation to FIG. 2, FIG. 6A shows a user, represented by the hand 222 (not drawn to scale in the figure), selecting the prior context region 208 of the navigation bar 204. In embodiments where the display 214 is a touch-sensitive display, the user may select the prior context region 208 by touching the display 214 at the area of the prior context region 208. In embodiments where the display 214 is not touch sensitive, the selection may be made via other input/control devices, such as push buttons and the like.

In the prior context region 208, the indicator 216 shows that the immediately preceding application context 224 (FIG. 6B) is labeled as context "A." It should be appreciated, however, that the application contexts, labels, and so forth shown in FIG. 6 and in subsequent embodiments are merely exemplary.

FIG. 6B shows the device shifting operation to context A and simulating shifting of the display to the user interface of context A. The (former) current application context 206, labeled as context "B" by the indicator 218 (FIG. 6A), slides out of view on the right side of the display 214. Concurrently, the (new) current application context A 224 slides into view from the left side of the display 214. The indicators in the navigation bar also shift. The indicator 218 for the (former) current application context has been removed from the navigation bar. The indicator 216 for context A slides into the current context region 210 and becomes the indicator for the new current application context. An indicator 226 for a context region that immediately precedes context A, labeled as "C" by the indicator 226, slides into the prior context region 208 from the left side of the display 214.

FIG. 6C shows the display 214 after the completion of the shifting of the operation to context A. Indicator 216 occupies the current context region 210 and indicator 226 occupies the prior context region 208. Context A 224 is active and is displayed in the display 214. The label in the title bar 202 has also changed to reflect the new current application context. In FIGS. 6A-6C, the label 220 in link region 212 ("X") remains unchanged as the current context is changed. However, as discussed above, in some embodiments, the label 220 in link region 212 may change as the current application context changes. That is, the link region 212 may be a context sensitive link to an application context, and the application context to which the link region 212 is linked changes based on the where the user is in the application.

In situations where the indicated context in the selected prior context region is the initial context, the prior context region may be omitted from the navigation bar because there is no preceding context to be indicated in the prior context region once the initial context becomes the current context.

Figure 7A:
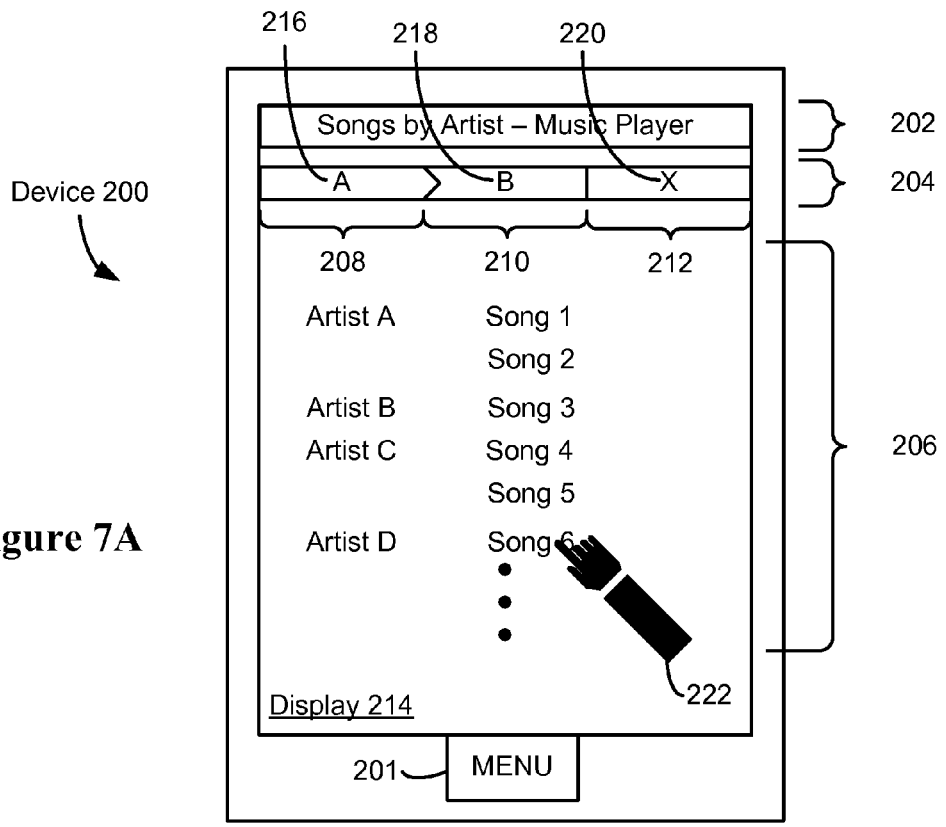
FIGS. 7A-7C are diagrams illustrating navigation to a succeeding application context of an application, according to some embodiments of the invention.
Figure 7B:
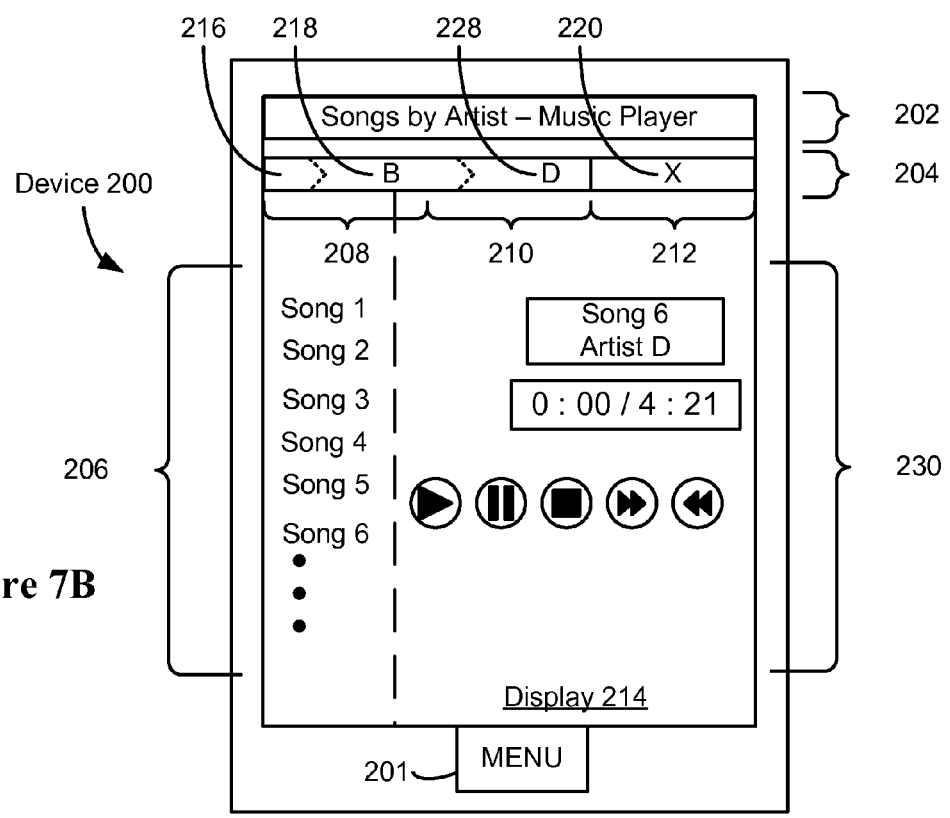
Figure 7C:
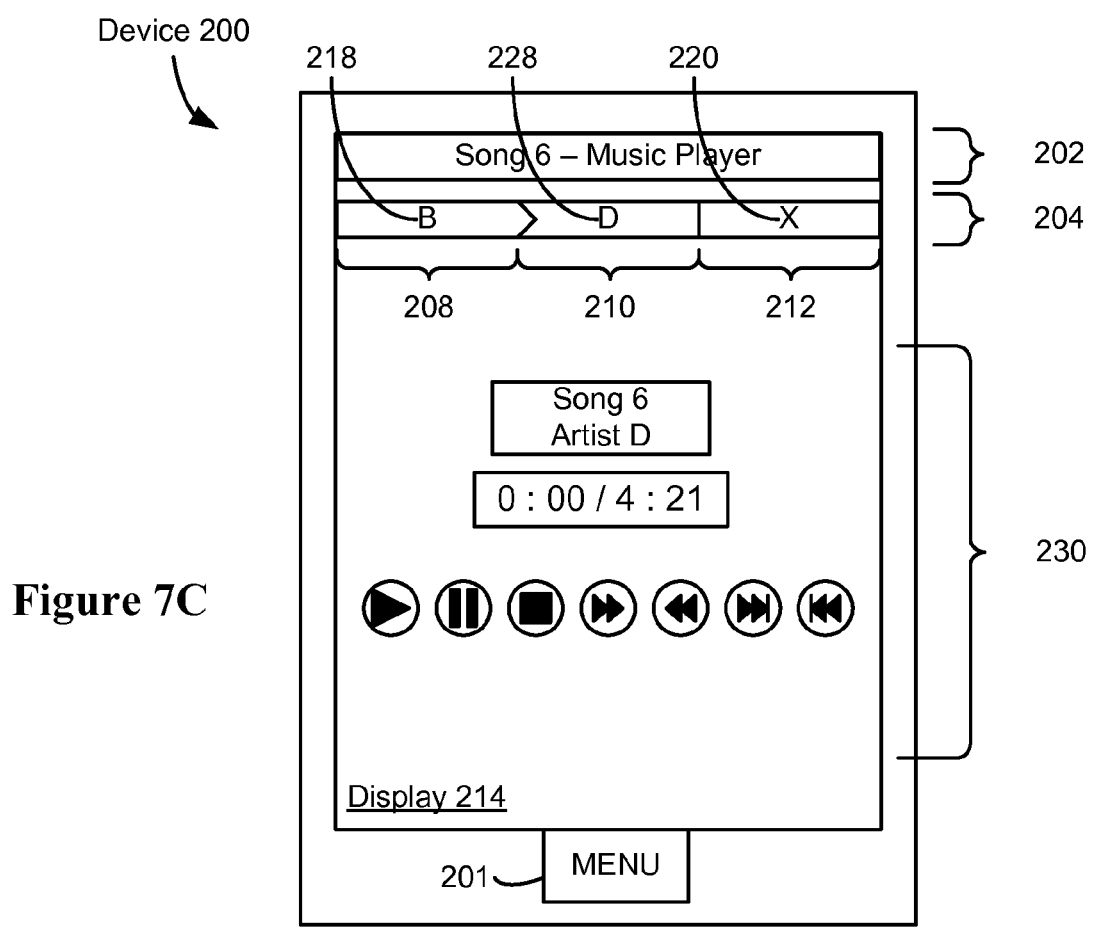

FIGS. 7A-7C are diagrams illustrating navigation to a succeeding application context of an application, according to some embodiments of the invention. FIG. 7A shows a user, represented by the hand 222 (not drawn to scale in the figure), selecting a song from the current application context 206 of a list of songs sorted by artist. Selection of a song from the list shifts operation of the device to a succeeding context in the active application, such as a player controls context for the selected song. In embodiments where the display 214 is a touch-sensitive display, the user may make the selection by touching the display 214 at the area of the name of the song. In embodiments where the display 214 is not touch sensitive, the selection may be made via other input/control devices, such as buttons and the like.

FIG. 7B shows the device shifting operation to the succeeding application context and simulating shifting the display to the player controls context. The current context 206 slides out of view on the left side of the display 214. Concurrently, the player controls context 230 slides into view from the right side of the display 214. In the navigation bar 204, the indicator 216 for the preceding application context slides out of view on the left side of the display 214. The indicator 218 for the formerly current context slides into the prior context region 208. A new indicator 228 for the player controls context, labeled as context "D," appears in the current context region 210.

FIG. 7C shows the display 214 after the completion of the shifting of the operation to context D. Indicator 228 occupies the current context region 210 and indicator 218 occupies the prior context region 208. Context D 230 is active and is displayed in the display 214. The label in the title bar 202 has also changed to reflect the new current application context.

Figure 8A:
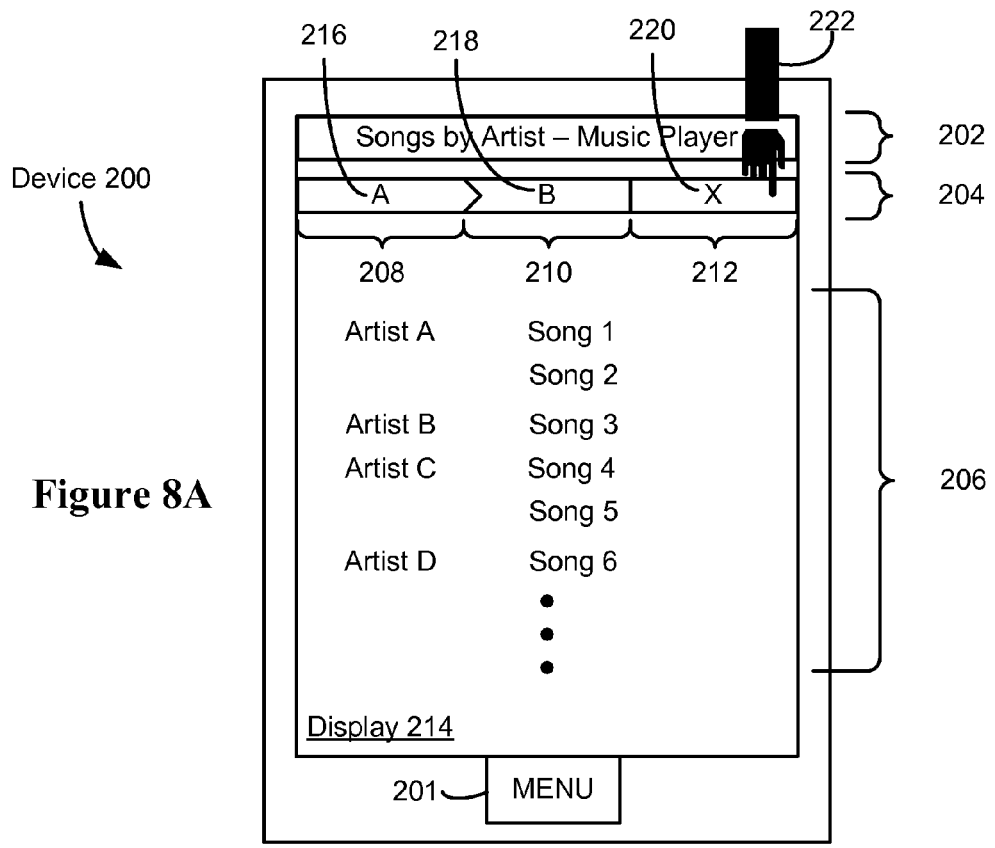
FIGS. 8A-8C are diagrams illustrating navigation to a predefined application context of an application, according to some embodiments of the invention.
Figure 8B:
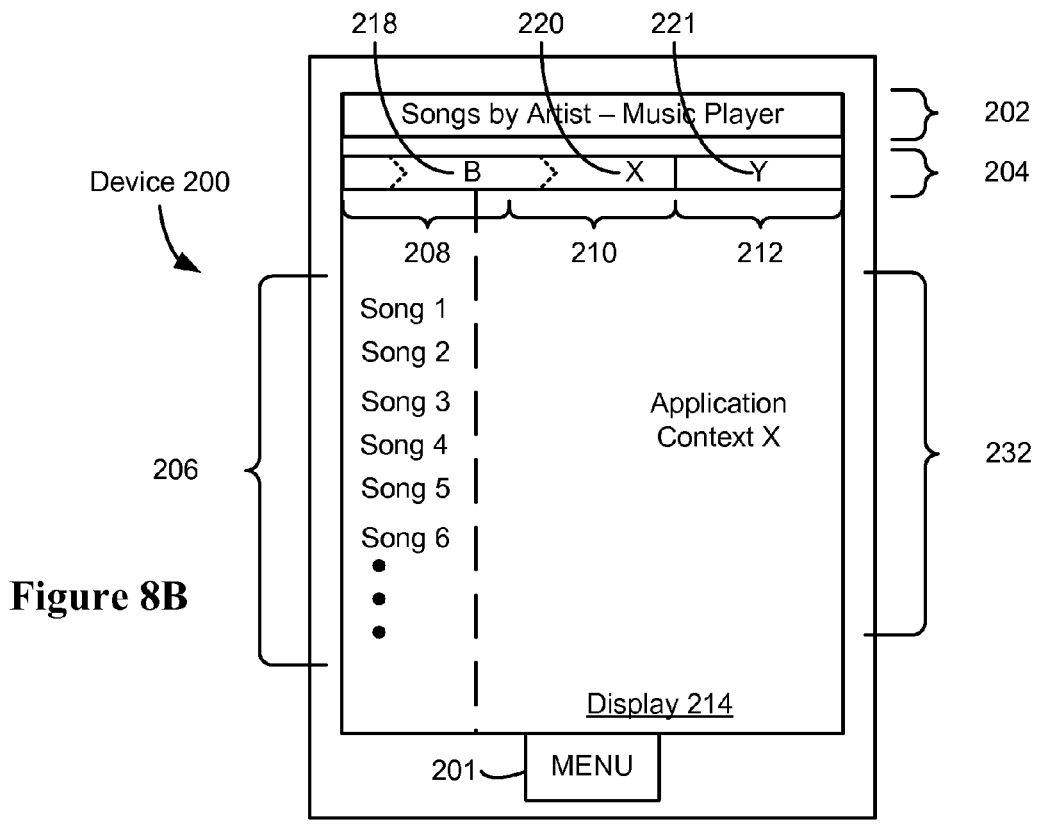
Figure 8C:
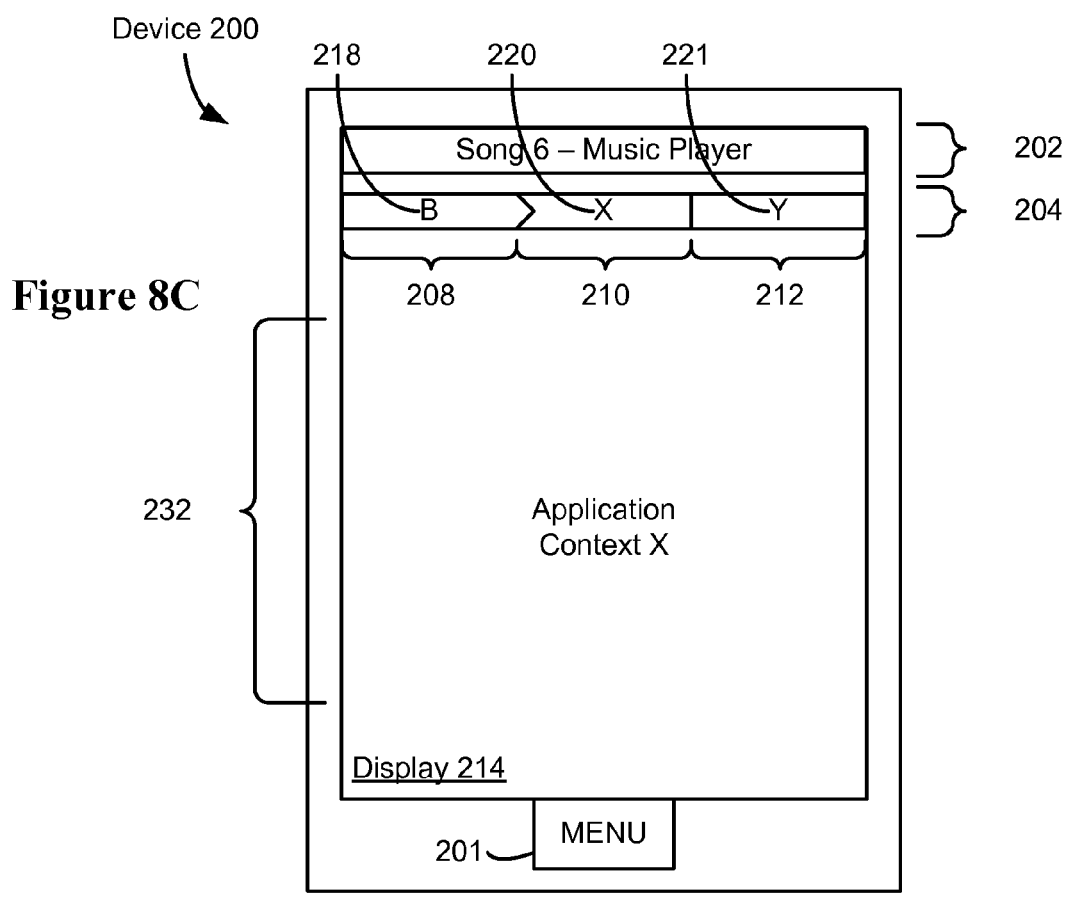

FIGS. 8A-8C are diagrams illustrating navigation to a predefined application context of an application via a link in a navigation bar, according to some embodiments of the invention. FIG. 8A shows a user, represented by the hand 222 (not drawn to scale in the figure), selecting the link region 212 in the navigation bar 204. Selection of the link region shifts operation of the device to a predefined application context within the active application. In embodiments where the display 214 is a touch-sensitive display, the user may make the selection by touching the display 214 at the area of the link region 212. In embodiments where the display 214 is not touch sensitive, the selection may be made via other input/control devices, such as push buttons and the like.

FIG. 8B shows the device shifting operation to the predefined application context and simulating shifting the display to the predefined application context, labeled by the indicator 220 as context "X." The current application context 206 slides out of view on the left side of the display 214. Concurrently, context X 232 slides into view from the right side of the display 214. In the navigation bar 204, the indicator 216 for the preceding context slides out of view on the left side of the display 214. The indicator 218 for the current context slides into the prior context region 208. An indicator 220 for context X slides into the current context region 212.

FIG. 8C shows the display 214 after the completion of the shifting of the operation to context X. Indicator 220 occupies the current context region 210 and indicator 218 occupies the prior context region 208. Context X 232 is active and is displayed in the display 214. The label in the title bar 202 has also changed to reflect the new current application context.

As described above, the link region 212 may be context sensitive and the predefined context to which the link region 212 links may vary based on what the current context is, what other operations of the application is running in the background, and so forth. Thus, an indicator 221 for a different predefined context may be inserted into the link region 212. As shown in FIGS. 8B and 8C, the new indicator 221, associated with another predefined application context labeled as "Y," is shown in the link region 212.

Figure 9A:
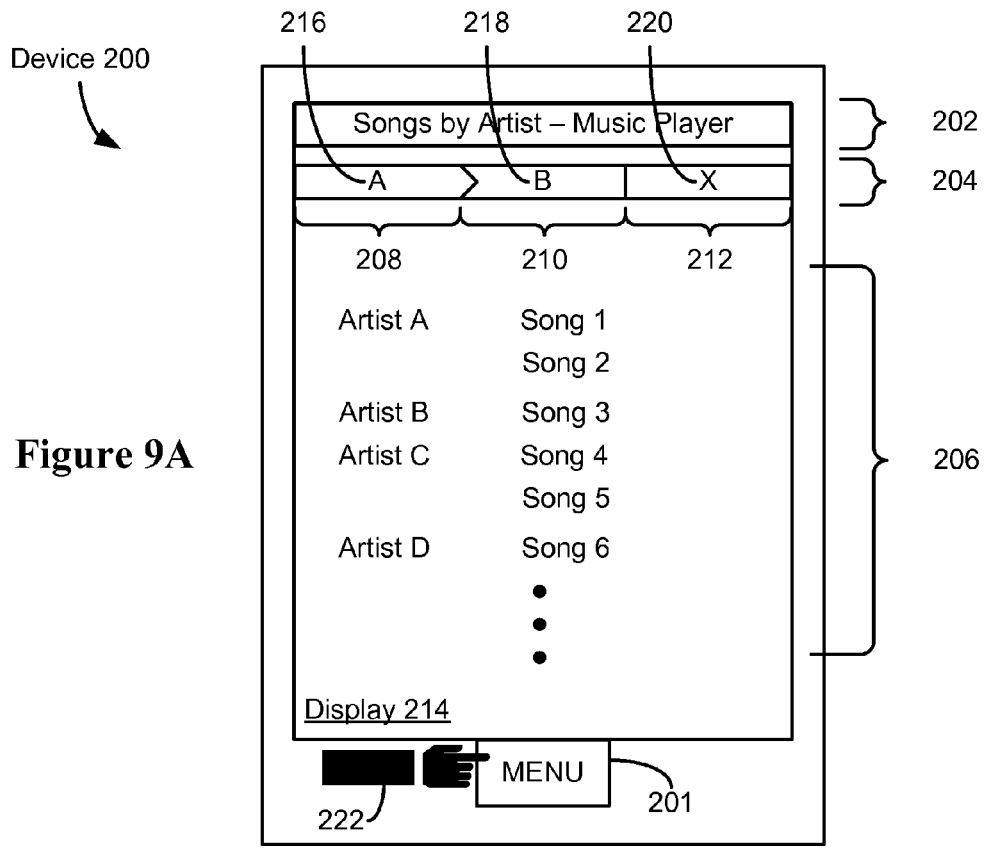
FIGS. 9A-9B are diagrams illustrating navigation to an application selection context, according to some embodiments of the invention.
Figure 9B:
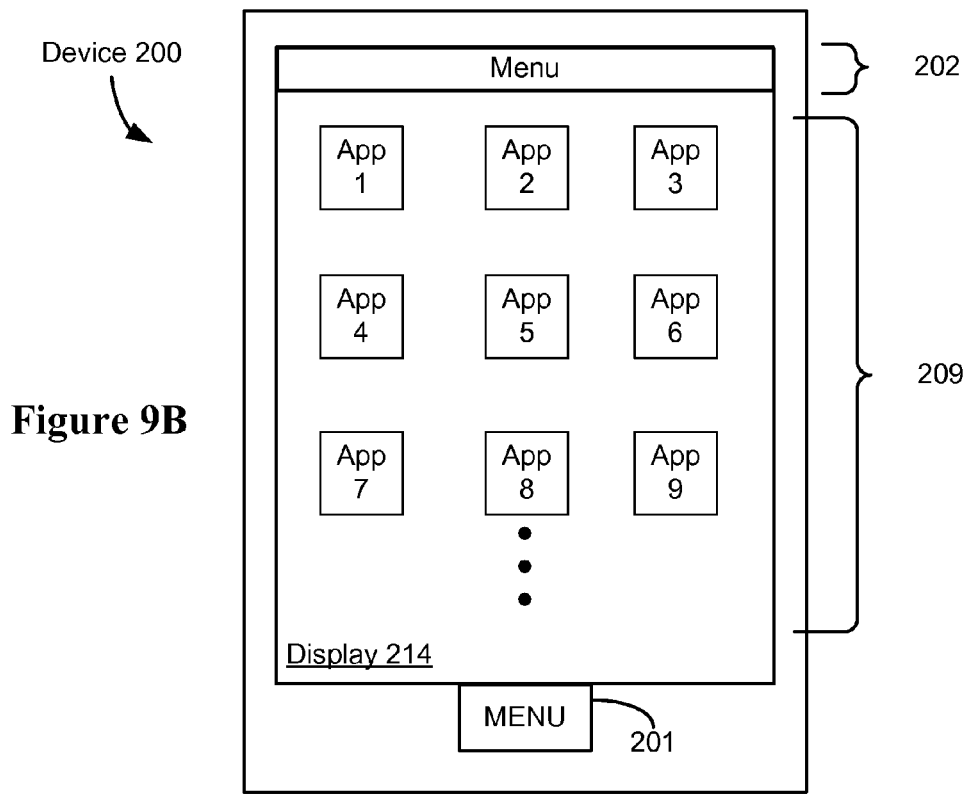

FIGS. 9A-9B are diagrams illustrating navigation to an application selection context via selection of a menu button, according to some embodiments of the invention. FIG. 9A shows a user, represented by the hand 222 (not drawn to scale in the figure), selecting the menu button 201 on the device 200. In response, the device 200 shifts operation from the active application to an application selection context 209 (FIG. 9B), from which the user may select and activate an application from a plurality of applications. FIG. 9B shows an exemplary application selection context 209 that may be displayed on the display 214. The navigation bar 204 is no longer displayed because the (formerly) active application is no longer active. The application selection context 209 includes a (textual and/or graphical) list of a plurality of applications, from which the user may select one for activation.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of navigating between application contexts in a portable device, comprising:
   displaying a current application context of a messaging application in an application display region of a display, wherein the current application context is a current mailbox context;
   displaying a navigation bar adjacent to the application display region, the navigation bar including at least three horizontally adjacent regions, comprising a current context region for displaying an indicator of a second application context comprising the current application context, a prior context region for displaying an indicator of a first application context comprising an application context preceding the second application context, and a link region, wherein the navigation bar maintains a fixed location on the display;
   upon detecting user selection of the prior context region, shifting operation of the portable device to the first application context, including changing display in the prior context region of the navigation bar from the indicator of the first application context to an indicator of a fourth application context comprising an application context of the messaging application that preceded the first application context, the indicator of the fourth application context being distinct from the indicator of the first application context; and
   upon detecting user selection of the link region, changing a message displayed in the current mailbox context.

2. The method of claim 1, wherein changing the message displayed in the current mailbox context includes replacing display of a first message in the current mailbox context with display of a second message in the current mailbox context.

3. The method of claim 2, wherein:
   the link region includes a previous icon and a next icon;
   the detecting user selection of the link region includes detecting selection of the next icon;
   the first message is a current message; and
   the second message is a next message.

4. The method of claim 2, wherein:
   the link region includes a previous icon and a next icon;
   the detecting user selection of the link region includes detecting selection of the previous icon;
   the first message is a current message; and
   the second message is a previous message.

5. The method of claim 1, wherein shifting operation of the portable device includes simulating shifting of the application display region in a first direction upon detecting user selection of the prior context region.

6. The method of claim 1, wherein shifting operation of the portable device includes simulating shifting of the application display region to the right upon detecting user selection of the prior context region.

7. The method of claim 1, further comprising:
   displaying in the prior context region a first label corresponding to the first application context; and
   displaying in the current context region a second label corresponding to the second application context.

8. A portable electronic device, comprising:
   a display;
   memory;
   a messaging application stored in the memory;
   one or more processors; and one or more modules stored in the memory and configured for execution by the one or more processors, the one or more modules comprising instructions for:

displaying a current application context of the messaging application in an application display region of the display, wherein the current application context is a current mailbox context;

displaying a navigation bar adjacent to the application display region, the navigation bar including at least three horizontally adjacent regions, comprising a current context region for displaying an indicator of a second application context comprising the current application context, a prior context region for displaying an indicator of a first application context comprising an application context preceding the second application context, and a link region, wherein the navigation bar maintains a fixed location on the display;

shifting operation of the portable device, upon user selection of the prior context region, to the first application context, including instructions to change display in the prior context region of the navigation bar from the indicator of the first application context to an indicator of a fourth application context comprising an application context of the messaging application that preceded the first application context, the indicator of the fourth application context being distinct from the indicator of the first application context; and changing a message displayed in the current mailbox context upon detecting user selection of the link region.

9. The portable electronic device of claim 8, wherein the instructions for changing the message displayed in the current mailbox context include instructions for replacing display of a first message in the current mailbox context with display of a second message in the current mailbox context.

10. The portable electronic device of claim 9, wherein:
the link region includes a previous icon and a next icon;
the instructions for detecting user selection of the link region include instructions for detecting selection of the next icon;
the first message is a current message; and
the second message is a next message.

11. The portable electronic device of claim 9, wherein:
the link region includes a previous icon and a next icon;
the instructions for detecting user selection of the link region include instructions for detecting selection of the previous icon;
the first message is a current message; and
the second message is a previous message.

12. The portable electronic device of claim 8, further including instructions for simulating shifting of the application display region in a first direction upon detecting user selection of the prior context region.

13. The portable electronic device of claim 8, further including instructions for simulating shifting of the application display region to the right upon detecting user selection of the prior context region.

14. The portable electronic device of claim 8, further comprising instructions for:
displaying in the prior context region a first label corresponding to the first application context; and
displaying in the current context region a second label corresponding to the second application context.

15. A computer readable storage medium storing one or more programs, the one or more programs comprising instructions, which when executed by a portable device, cause the device to:

display a current application context of a messaging application in an application display region of a display, wherein the current application context is a current mailbox context;

display a navigation bar adjacent to the application display region, the navigation bar including at least three horizontally adjacent regions, comprising a current context region for displaying an indicator of a second application context comprising the current application context, a prior context region for displaying an indicator of a first application context comprising an application context preceding the second application context, and a link region, wherein the current navigation bar maintains a fixed location on the display;

upon detecting user selection of the prior context region, shift operation of the portable device to the first application context, including changing display in the prior context region of the navigation bar from the indicator of the first application context to an indicator of a fourth application context comprising an application context of the messaging application that preceded the first application context, the indicator of the fourth application context being distinct from the indicator of the first application context; and upon detecting user selection of the link region, change a message displayed in the current mailbox context.

16. The computer readable storage medium of claim 15, wherein changing the message displayed in the current mailbox context includes replacing display of a first message in the current mailbox context with display of a second message in the current mailbox context.

17. The computer readable storage medium of claim 15, wherein:
the link region includes a previous icon and a next icon;
the detecting user selection of the link region includes detecting selection of the next icon;
the first message is a current message; and
the second message is a next message.

18. A graphical user interface for a portable electronic device with memory and one or more processors to execute one or more programs stored in the memory, the graphical user interface comprising:

an application display region that displays a current application context of a messaging application, wherein the current application context is a current mailbox context;

a navigation bar adjacent to the application display region, the navigation bar including at least three horizontally adjacent regions, comprising a current context region for displaying an indicator of the current application context, a prior context region for displaying an indicator of an application context preceding the current application context, and a link region, wherein the navigation bar maintains a fixed location on the display;

upon detecting user selection of the prior context region, shifting operation of the portable device to the first application context, including changing display in the prior context region of the navigation bar from the indicator of the first application context to an indication of a fourth application context comprising an application context of the messaging application that preceded the first application context, the indicator of the fourth application context being distinct from the indicator of the first application context; and upon detecting user selection of the link region, changing a message displayed in the current mailbox context.

19. The graphical user interface of claim 18, wherein changing the message displayed in the current mailbox context includes replacing display of a first message in the current mailbox context with display of a second message in the current mailbox context.

20. The graphical user interface of claim 18, wherein:
the link region includes a previous icon and a next icon;
the detecting user selection of the link region includes detecting selection of the next icon;
the first message is a current message; and
the second message is a next message.

21. The method of claim 1, wherein the current context region maintains a fixed location on the display.

22. The device of claim 8, wherein the current context region maintains a fixed location on the display.

23. The computer readable storage medium of claim 15, wherein the current context region maintains a fixed location on the display.

24. The graphical user interface of claim 18, wherein the current context region maintains a fixed location on the display.

* * * * *